(12) United States Patent
Engel et al.

(10) Patent No.: US 8,581,200 B2
(45) Date of Patent: Nov. 12, 2013

(54) RADIATION DETECTOR WITH MULTIPLE ELECTRODES ON A SENSITIVE LAYER

(75) Inventors: Klaus Jürgen Engel, Aachen (DE); Guenter Zeitler, Aachen (DE); Christian Baeumer, Aachen (DE); Christoph Herrmann, Aachen (DE); Jens Wiegert, Aachen (DE); Roland Proksa, Hamburg (DE); Ewald Rössl, Ellerau (DE); Roger Steadman Booker, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 912 days.

(21) Appl. No.: 12/514,595

(22) PCT Filed: Nov. 12, 2007

(86) PCT No.: PCT/IB2007/054577
§ 371 (c)(1), (2), (4) Date: Mar. 15, 2010

(87) PCT Pub. No.: WO2008/059425
PCT Pub. Date: May 22, 2008

(65) Prior Publication Data
US 2010/0187429 A1 Jul. 29, 2010

(30) Foreign Application Priority Data
Nov. 17, 2006 (EP) .................................. 06124309

(51) Int. Cl.
*H01L 27/146* (2006.01)
(52) U.S. Cl.
USPC .................................................. 250/370.09

(58) Field of Classification Search
USPC ....................................................... 250/370.09
See application file for complete search history.

(56) References Cited

U.S. PATENT DOCUMENTS

| 4,363,969 A | 12/1982 | Ong |
| 4,937,453 A * | 6/1990 | Nelson ..................... 250/370.09 |
| 5,821,540 A | 10/1998 | Sato et al. |

(Continued)

FOREIGN PATENT DOCUMENTS

| FR | 2705791 A1 | 12/1994 |
| FR | 2792418 A1 | 10/2000 |

(Continued)

OTHER PUBLICATIONS

Bolotnikov, A. E., et al.; Charge loss between contacts of CdZnTe pixel detectors; 1999; Nuclear Instruments and Methods in Physics Research A; 432:326-331.

(Continued)

*Primary Examiner* — David Porta
*Assistant Examiner* — Mindy Vu

(57) ABSTRACT

The invention relates to a radiation detector (200), particularly an X-ray detector, which comprises at least one sensitive layer (212) for the conversion of incident photons (X) into electrical signals. A two-dimensional array of electrodes (213) is located on the front side of the sensitive layer (212), while its back side carries a counter-electrode (211). The size of the electrodes (213) may vary in radiation direction (y) for adapting the counting workload of the electrodes. Moreover, the position of the electrodes (213) with respect to the radiation direction (y) provides information about the energy of the detected photons (X).

19 Claims, 3 Drawing Sheets

(56) References Cited

U.S. PATENT DOCUMENTS

| | | |
|---|---|---|
| 5,943,388 A | 8/1999 | Tumer |
| 6,236,051 B1 | 5/2001 | Yamakawa et al. |
| 6,727,503 B1 | 4/2004 | Gerstenmayer |
| 7,009,183 B2 | 3/2006 | Wainer et al. |
| 7,034,313 B2 | 4/2006 | Hoffman |
| 7,109,490 B2 | 9/2006 | Fuchs et al. |
| 2005/0242292 A1 | 11/2005 | El-Hanany et al. |
| 2006/0033029 A1 | 2/2006 | Popper |
| 2006/0151708 A1 | 7/2006 | Bani-Hashemi et al. |

FOREIGN PATENT DOCUMENTS

| | | |
|---|---|---|
| JP | 60135884 | 7/1985 |
| JP | 60187879 | 9/1985 |
| JP | 08187239 | 7/1996 |
| JP | 09275223 | 10/1997 |
| JP | 2001051064 | 2/2001 |
| JP | 2003167058 | 6/2003 |
| JP | 2005164521 | 6/2005 |
| JP | 2006101926 | 4/2006 |
| JP | 2006242958 | 9/2006 |
| WO | 0017670 A1 | 3/2000 |
| WO | 2006029475 A1 | 3/2006 |

OTHER PUBLICATIONS

Barrett, H. H., et al.; Charge Transport in Arrays of Semiconductor Gamma-Ray Detectors; 1995; Physical Review Letters; 75(1)156-159.

Eskin, J. D., et al.; Signals induced in semiconductor gamma-ray imaging detectors; 1999; J. of Applied Physics; 85(2)647-659.

* cited by examiner

RADIATION DETECTOR WITH MULTIPLE ELECTRODES ON A SENSITIVE LAYER

The invention relates to a radiation detector comprising a sensitive layer for the conversion of photons into electrical signals with multiple electrodes on its surface. Moreover, it relates to an X-ray detector and an imaging system comprising such a radiation detector.

The US 2006/0033029 A1 discloses a radiation detector comprising a stack of sensitive layers, for example CeZnTe (CZT) crystals, with electrodes on their front and back sides. In one particular design, the electrodes take the form of parallel stripes, wherein the stripes on the front and back side are perpendicular to each other. Radiation can impinge on said detector both parallel and orthogonal to the sensitive layers.

Based on this situation it was an object of the present invention to provide an alternative detector design, wherein it is desirable that said design is easier to fabricate and particularly suited for the use in a counting detector.

This object is achieved by a radiation detector according to claim 1, an X-ray detector according to claim 12, and an imaging system according to claim 13. Preferred embodiments are disclosed in the dependent claims.

A radiation detector according to the present invention may serve for the quantitative and/or qualitative detection of electromagnetic radiation, particularly X-radiation or gamma radiation, in any field of application. It comprises the following components:

a) A radiation aperture through which photons of the radiation to be detected can enter, wherein said photons propagate in the mean along a given radiation direction. The radiation aperture may be a physical entity like an opening in a shutter, or it may simply denote a geometrical region.

b) A sensitive layer for the conversion of photons, which come through the aforementioned radiation aperture, into an electrical signal, wherein said sensitive layer has a front side and opposite thereto a back side which are parallel to the aforementioned radiation direction. Moreover, the front side and the back side are preferably parallel to each other. The sensitive layer is typically a one-piece, monocrystalline or polycrystalline structure, wherein the material can for example be selected from the group consisting of CZT, Selenium or PbO. The electrical signal that is generated by incident photons is typically an electrical charge, particularly an electron-hole pair.

c) A two-dimensional array of individually addressable electrodes that are located on the front side of the sensitive layer, wherein at least two of these electrodes have different shapes. By definition, the electrodes of a "two-dimensional array" lie in two perpendicular directions one behind the other. The array therefore comprises at least four electrodes arranged at the corners of an (arbitrary) quadrilateral. Moreover, the term "shape" shall by definition include both form and size; thus two quadratic electrodes of different size are considered to also have different shapes. Typically, the electrodes have regular forms like rectangles, polygons, or circles, and are arranged in a regular pattern like a matrix pattern. The feature that the electrodes are "individually addressable" means that each electrode can be clamped to an electrical potential independently of the other electrodes and that electrical signals (e.g. electrical charges arriving at the electrodes) can be sampled from each electrode independently. Finally, it should be noted that the terms "front side" and "back side" are arbitrarily associated to two opposite sides of the sensitive layer and that it is therefore no limitation of generality to demand that the electrode array is located on the front side.

d) At least one counter-electrode that it is located on the back side of the sensitive layer. As the name indicates, the counter-electrode is usually connected to the opposite terminal of an electrical power supply than the electrodes on the front side of the sensitive layer. In many applications, the counter-electrode serves as a cathode collecting e.g. holes generated by incident radiation, while the electrodes of the array serve as anodes collecting the associated electrons. The counter-electrode typically covers substantially the whole back side of the sensitive layer, though it is also possible that there is a one- or two-dimensional array of counter-electrodes on the back side.

The described radiation detector has the advantage to be very well suited for photon counting applications, as the whole volume of the sensitive layer is functionally divided into (at least) as many sensitive sub-regions as there are electrodes in the electrode array on the front side. Thus the counting rate that each of these electrodes has to cope with can be limited to well manageable values by dimensioning the electrodes correspondingly small. A further advantage is that the distance between the electrodes of the array and the counter-electrode can be kept small because the photons propagate perpendicular to said distance and can therefore not be lost by making the distance too small. The possibility of a small distance between the electrodes has the advantage that fast responses with little loss of photons and less artifacts can be achieved, which significantly improves the measurement results.

According to a further development of the radiation detector, at least two electrodes on the front side of the sensitive layer have a different height, wherein said height is by definition measured in the radiation direction. In particular, the height may vary from electrode to electrode in radiation direction. In this way the size of the sensitive sub-regions in the sensitive layer, which is defined by the size of the associated electrodes, can be optimally adapted to the conditions of photon conversion along the radiation direction.

In a particular embodiment of the aforementioned approach, the height of the electrodes on the front side of the sensitive layer increases in the radiation direction. Such an increase accounts for the fact that the number of photons in an incident beam steadily decreases in radiation direction due to absorption and conversion; electrodes at the beginning of the photon path will therefore have to manage higher counting rates than electrodes farther behind in radiation direction, which can be correspondingly larger.

In another preferred embodiment of the invention, at least one electrode on the front and/or the back side of the sensitive layer is connected to a signal processing circuit that comprises at least one amplifier for amplifying the signal sensed by the electrode, at least one discriminator for suppressing electrical pulses below an associated, predetermined threshold, and/or at least one pulse counter for counting the number of electrical pulses sensed by the electrode. With a pulse counter, the number of photons converted in the sensitive sub-region of the associated electrode can be determined. A set of discriminators with different thresholds can favorably be used to determine if the energy of a converted photon was within a certain energy window and therefore allows spectrally resolved measurements. Preferably all electrodes on the front side are connected to at least one corresponding amplifier, discriminator and/or counter.

At least one electrode on the front or the back side of the sensitive layer may optionally be connected to an evaluation module which is adapted to associate the position of the electrode to the energy of the detected photons. This approach exploits the fact that the local likelihood of conversion of a photon in the sensitive layer depends on the energy of said photon; thus high-energy photons will typically propagate further into the sensitive layer before they are converted than low-energy photons. Preferably all electrodes on the front side are connected to the evaluation module. It should however be noted that the energy information provided by the depth-of-interaction is preferably only used to verify or assist some other (more precise and primary) method of energy determination executed by the evaluation module. Thus the pulse height of the generated electrical signals will usually be discriminated by a set of several discriminators with different thresholds that are associated to each electrode of the electrode array to provide primary information about the energy of an absorbed photon.

There are various possibilities to contact the electrodes on the front side of the sensitive layer for connecting them to appropriate signal processing electronics. In a preferred embodiment, contact lines are located on the front side of the sensitive layer, wherein each of these contact lines leads from one particular edge of the sensitive layer, called "connecting edge" in the following, to one of the electrodes. In this case no space consuming extra layer is required between two sensitive layers for routing purposes. The connecting edge is preferably located opposite to the edge of the sensitive layer that lies next to the radiation aperture because the contact lines and the associated processing electronics is in this case kept out of the incident radiation.

In a further development of the aforementioned approach, the electrodes on the front side have a width—which is by definition measured parallel to the connecting edge—that increases with their distance from the connecting edge. The electrodes thus occupy space on the front side that becomes successively available as contact lines starting at the connecting edge end when they reach their associated electrode.

While the above description of the radiation detector and its preferred embodiments made no assumptions with respect to the number of sensitive layers (i.e. it is valid for a design with just one sensitive layer), it is preferred that the radiation detector comprises a plurality of sensitive layers with associated electrodes of the required features, wherein said layers are stacked one behind the other in a direction seen from their front side to their back side. With such a stack of sensitive layers and associated electrodes, an arbitrary large sensitive volume can be composed that meets the requirements of the underlying application.

The aforementioned design with a stack of sensitive layers preferably comprises at least two adjacent sensitive layers with facing front sides or back sides. Preferably, all sensitive layers of the whole stack are arranged in pairs of two adjacent layers with facing front or back sides. This design has the advantage that electrodes can be shared between the adjacent sensitive layers (the counter-electrode can for instance be disposed between the back sides of two adjacent, oppositely orientated sensitive layers).

According to a further development of the design with stacked sensitive layers, an insulation layer (for electrically isolating electrodes that are associated to different sensitive layers), a semiconductor layer, a photon absorbing layer, and/or a layer with lines contacting the electrodes may be located between two adjacent sensitive layers. If an anti-scatter grid or a similar device is present, the mentioned layers are preferably aligned with it to minimize the loss of sensitive area. A semiconductor layer, e.g. a CMOS layer, may be used to contact electrodes and to provide signal processing circuits, e.g. amplifiers, discriminators and/or counters for pulse height measurements based on multiple thresholds. A layer with contact lines may be used to provide individual access to the electrodes without requiring space for routing in the plane of the front side or back side of the sensitive layers.

In the aforementioned embodiment, the photon absorbing layer may particularly be used to absorb fluorescence photons that would otherwise lead to crosstalk between neighboring pixels. It is therefore preferred that the photon absorbing layer is highly absorbing for such fluorescence photons which are generated in an adjacent sensitive layer by the primary photons impinging onto that layer through the radiation aperture. This is for example achieved if the K-edge of the absorbing material is slightly below the fluorescence photon energy. Examples of suitable materials for the absorbing layer comprise Ag, Pd, Mo, and Zr.

The invention further relates to an X-ray detector comprising a radiation detector of the kind described above that is sensitive to X-rays. Moreover, it relates to an imaging system comprising a radiation detector of the kind described above, wherein said imaging device may particularly be an X-ray, CT (Computed Tomography), PET (Positron Emission Tomography), SPECT (Single Photon Emission Computed Tomography) or nuclear imaging device.

These and other aspects of the invention will be apparent from and elucidated with reference to the embodiment(s) described hereinafter. These embodiments will be described by way of example with the help of the accompanying drawings in which.

Like reference numbers or numbers differing by integer multiples of 100 refer in the Figures to identical or similar components.

Figure 1:
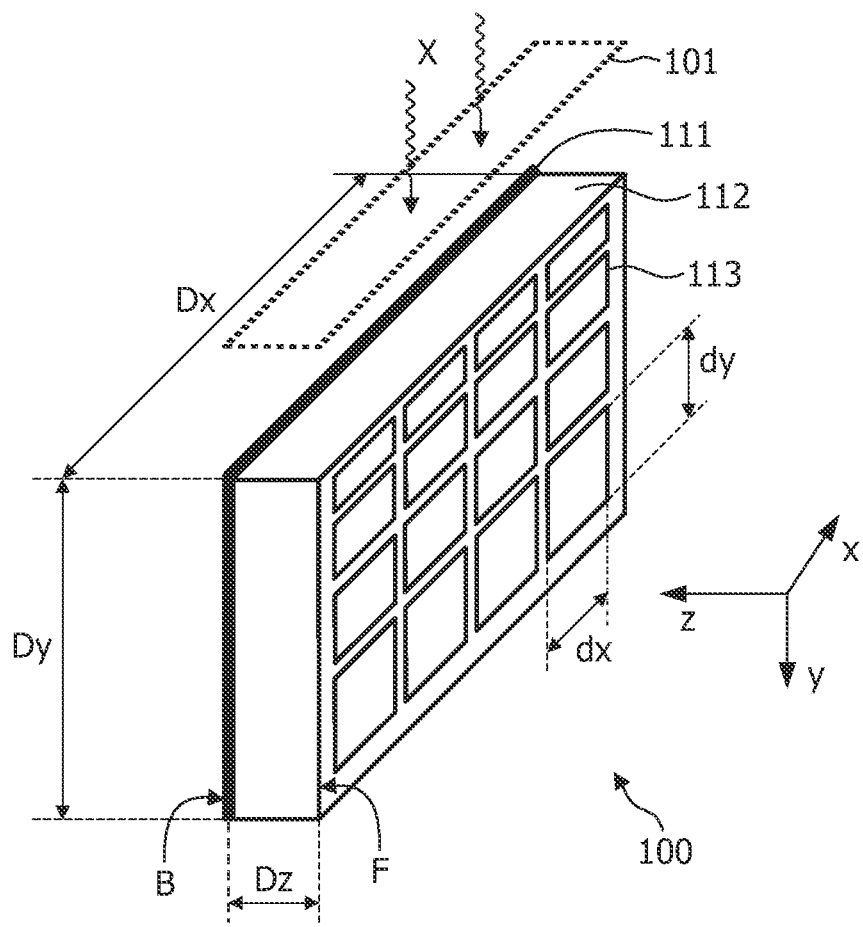
FIG. 1 shows a schematic perspective view of a single layer X-ray detector according to the present invention with electrodes of various sizes in y-direction.

In the following, the present invention will be described with respect to the example of an X-ray detector, particularly an X-ray detector as it can be used in a medical imaging system like a CT scanner. It should however be noted that the invention is not limited to this application but can be used with advantage in any field where the detection of radiation is required.

The detection of X-rays is still an area of intense research. Many efforts concentrate in this respect on developing detectors with faster response time, higher spatial resolution, and especially the possibility to detect energy resolved single photon conversion events.

A currently applied concept in Computed Tomography (CT) and X-ray imaging with flat detectors is a scintillator material (like CsI, CWO or GOS), glued onto a photodiode. The scintillator converts X-rays into optical photons (indirect conversion), which pass the glue layer, and are converted into an electrical signal in the photodiode. In most applications (like CT or flat detectors), this concept has the drawbacks of a slow response time, afterglow issues, as well as a weak spatial resolution.

In contrast to this, direct conversion materials (like CZT, Selenium or PbO) provide a concept in which X-rays are directly converted into electron-hole pairs. The resulting cloud of charge carriers then drifts in an electrical field in the order of kV per cm to the electrodes on the surfaces of the conversion material. The electrical pulse generated there can be detected and counted, wherein the pulse height allows the detection of the energy of the photon. In general, the concept of direct conversion provides a better response time, a higher spatial resolution, and in principle could allow for single photon detection with energy resolution.

In a possible setup of direct conversion detectors, one electrode covers the surface of the conversion material (typically that surface to which the X-ray photons are incident), while the opposite surface is covered by a "pixel" array of electrodes. Ideally, the pixel pitch is chosen according to the intended application's needs and takes into account the size of the charge cloud which is generated by the follow-up ionization shower of an incident X-ray photon. Typically, the pitch is in the range of 50-500 µm.

The maximal count rate of direct conversion detectors depends on several effects such as the mean drift length of the electrons. The distance of the electrodes is an important parameter in this respect and should be as small as possible. A certain height of the conversion material in radiation direction is however required to get sufficient stopping power for the photons and to achieve high detective quantum efficiency. For example, a CZT detector in a medical application is expected to have a height of at least 2 mm, which is much larger than the charge clouds generated by X-ray photons. The generated charge carriers have to drift a long way to the electrode, which considerably impairs response time of the detector, as well as detective quantum efficiency (due to charge carrier trapping and recombination leading to signal losses).

Moreover, there is—depending on the conversion material—a certain probability for a charge carrier to meet a localized trap-state inside the material. Trap states are local disorders within the crystalline structure of the material, which might "bind" charge carriers for a certain time and then release them, causing the so-called "afterglow" effect. Afterglow generates a history dependent signal on a longer time scale (normally in the ms to seconds time domain), which is strongly unwanted in most applications, especially in CT, which deals with a high dynamic signal range and acquires projection images with a high frame rate.

As was already mentioned, there is a desire in Computed Tomography to move to energy resolving imaging. Such energy resolution can be achieved by using counting detectors in combination with a direct converter material. By setting a certain number of thresholds it is possible to count with such a detector how many photons were within a certain energy window. A limiting factor for spectral CT readout electronics based on counting detectors are however the very high counting rates that the electronics has to deal with. Typically, one way of dealing with this very high counting rate is to reduce the pixel size.

Another important effect observed in direct conversion materials is called K-fluorescence: It happens that the incoming X-ray photon interacts with the e.g. CZT material such that another photon with less energy is generated. This fluorescence photon will travel through the CZT and generate another event somewhere. If the fluorescence photon reaches a position in the CZT close to a different anode, the detector response will usually be interpreted wrong. Instead of one photon, two photons with less energy are registered. This problem can be addressed with large detector cells, as they decrease the likelihood that a fluorescence photon can escape. The count rate problem requires however the opposite, because smaller cells have less photons to count and the total workload of counting can be divided to more smaller cells.

The present invention provides a design for a direct conversion detector that addresses the above mentioned issues. This design comprises a new way of placing the electrodes on a direct converter such that counting capabilities are optimally exploited and energy may be better resolved by taking into account the absorption depth of the photons in the material.

FIG. 1 shows an X-ray detector 100 according to a first realization of the aforementioned approach. For simplicity, only a single layer of the detector 100 is shown, though it typically comprises a plurality of such layers (cf. FIG. 2). The X-ray detector 100 comprises the following components:

1. A sensitive layer 112 of a converter material like CZT in which X-ray photons X are converted into electron-hole pairs that can be detected as electrical signals. The sensitive layer 112 is typically shaped as a thin cuboid slice with a front side F and a back side B.

2. A two-dimensional array of individually addressable electrodes 113 (typically serving as anodes) located on the front side F of the sensitive layer 112. In the shown example, the electrodes 113 are arranged in a matrix of four rows (x-direction) and four columns (y-direction), wherein the electrodes in the rows have equal size while the height dy of the electrodes increases in each column from top to bottom (i.e. in radiation direction y). In general, the dimensions dx and dy of the electrodes 113 may be arbitrarily set to accommodate reasonable counting rates and energy separation. As measurements show, the closer to the surface of radiation aperture, the higher the counting rates that can be observed. This fact is taken into account by the smaller electrode size dy at the top of the sensitive layer 112. The actual size of the electrodes 113 may be devised according to the desired maximum counting rate and the required spectral resolution.

As the electrodes 113 determine the spatial resolution of the device, they will sometimes be called "pixels" in the following.

3. A counter-electrode 111 located on the back side B of the sensitive layer 112, wherein said counter-electrode typically serves as a cathode.

4. A radiation aperture 101 which is simply indicated here by a rectangular opening through which X-radiation X can enter the device and propagate into the sensitive layer 112 in the mean radiation direction y. In contrast to most of the usual detector designs, the radiation X therefore propagates perpendicular to the electrical fields that are generated between the electrodes 113 on the front side F and the counter-electrode 111 on the back sides B.

An advantage of the described geometry is the much shorter drift length for charge carriers, which propagate horizontally (z-direction) between the layer surfaces F, B instead of vertically (y-direction) through the whole block of converter material. The drift length can thus be reduced by a factor G between 10 and 20, implying the following advantages:

better response times (by factor G since charge carriers are faster at the electrodes);

reduced afterglow (by factor G since traps are less frequented);

improved detective quantum efficiency (due to fewer electron-hole recombinations and signal losses due to trapping);

increased spatial resolution (due to confinement of the propagation direction and a smaller charge diffusion);

the voltage between the electrodes can be lowered by the factor G, while keeping the same strength of the electrical field.

Another advantage of the design shown in FIG. 1 relates to the structuring of the electrodes 113 in radiation direction y. As measurements show, the absorption of incident photons X depends significantly on the photon energy and the depth y that the photons have traveled in the sensitive material. In particular, photons with higher energy are absorbed very deep in the material while lower energy photons interact close to the surface of the material. The y-position at which a photon X is converted/detected in the sensitive layer 112 therefore comprises implicit information about the energy of that photon.

Typical dimensions of the radiation detector 100 shown in FIG. 1 are as follows:
- Height Dy of the sensitive layer 112 is about 3 mm, which is required to have sufficient stopping power in the X-ray beam direction.
- Thickness Dz of the sensitive layer 112 is about 0.1 mm to 0.5 mm, which is a compromise of three effects: (i) it should be as small as possible to decrease the count-rate load of detector cells; (ii) it should be as large as possible to decrease the fluorescence problem; and (iii) it should be as large as possible to reduce the overall production effort and cost.
- The length Dx of the sensitive layer 112 has to balance the required size of the detector in the x-direction and the production issue of sub-modules of converter material. A detector can be subdivided in this direction into smaller sub-modules.
- The length dx of the front side electrodes 113 is about 0.1 mm to 0.3 mm, which is a compromise between the count-rate division (asks for small electrodes) and the fluorescence problem (asks for large electrodes).
- The height dy of the front side electrodes 113 varies from top to bottom, wherein the top-most electrode should be as small as possible for high count rates but not too small to suffer not too much from the fluorescence effect. The lower electrodes can be made larger because the absorption likelihood decreases rapidly in y-direction and the count rate requirements, too. A number of three to four electrodes in the y-direction is preferred.

Figure 2:
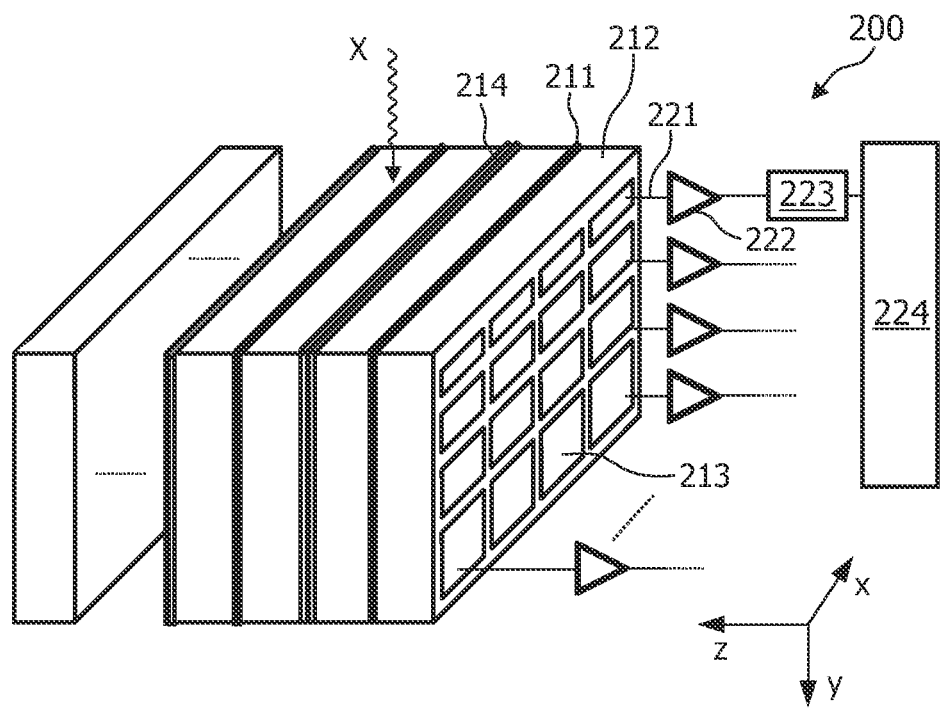
FIG. 2 shows a schematic perspective view of a multilayer X-ray detector according to the present invention.

FIG. 2 shows a multilayer radiation detector 200 which comprises a plurality of single-layer radiation detectors of the kind shown in FIG. 1 stacked one behind the other. All electrodes 213 on the front side of the individual sensitive layers 212 are connected via lines 221 to an amplifier 222 (typically a pre-amplifier with a shaper) and a discriminator unit 223. All channels (i.e. all electrodes 213) typically have the same set of threshold levels, beginning with a threshold set at or well above the noise level (approximately 20 keV to 30 keV for CT). The spectral information about a detected photon is obtained by evaluation of the associated electrical pulse, i.e. the pulse height is determined/discriminated in the discriminator unit 223 with respect to the plurality of given thresholds (this coarse determination evaluates only in which of several ranges the pulse height falls). Moreover, additional information about the photon energy is inherently given by the y-position of the electrode 213 that provided the particular count. The whole spectral information is evaluated by an evaluation module 224. Though the depth-of-interaction is used in this approach only as an additional input, it should be noted that it could alternatively also be used as the only energy-related information to simplify the detector design (that uses e.g. only one threshold per electrode for suppressing noise).

In a multilayer arrangement like that of FIG. 2, a certain fraction of the sensitive area (x-z-plane) will be lost due to the space required for the electrode layers. However, since the thickness of the electrode layers (typically about 5 μm) is small as compared to the thickness Dz of the conversion material (typically more than 50 μm), the lost area is relatively small and overcompensated by the advantageous effects listed above.

The fact that the detector 200 is composed of several thin layers may be advantageous with respect to the usage of polycrystalline direct conversion materials, which can be produced more simply and cheaply (e.g. by evaporation) than mono-crystalline ones. The thin layers can compensate the lower mobility of charge carriers in polycrystalline materials, so that the detection device achieves a sufficiently short response time, which may otherwise be impossible with polycrystalline materials.

The back sides of the thin slices 212 of direct conversion material are completely covered by cathodes 211. The cathodes collect holes that have for standard direct conversion materials (like CZT) in general a lower mobility and a shorter lifetime than electrons. On the front sides of the slices, the matrix pattern of anodes 213 collects spatially resolved the faster moving electrons. The thickness of the conversion material corresponds to the pitch of the anodes 213 and is typically in the order of e.g. 100 μm. In order to make—in addition—use of the small pixel effect (see e.g. Barrett et al., Phys. Rev. Lett. 75, 156-159, (1995); Eskin et al., J. Appl. Phys., 85, 647-659 (1999)), a thicker slice (e.g. of 4 to 10-times the anode pitch) may be advantageous while keeping the pitch of the anodes small.

In the multilayer detector 200 of FIG. 2, pairs of two slices are put together back-to-back. Each such double-layer is then separated from the adjacent double-layer by a thin insulator foil 214. In this paired-slice geometry, electrodes of the same potential are put close together under prevention of capacitive effects. An insulator foil for the cathodes 211 of adjacent double-layers is not necessary.

The advantages of the proposed detector design can be discussed in relation to a detector with the same compromise of the anode dimension (count-rate versus fluorescence) of 0.3 mm and the same height of the conversion material (3 mm). The conventional design has a cell density of 1/(0.3 mm) and a mean drift length of the electrons of about 2.5 mm. The large drift length comes from the fact that the likelihood of absorption is much higher in the upper part of the detector and the mean remaining way to the anode is long. The design proposed here has a cell density of 4/(0.5 mm) if four anodes can be placed in the y-direction. The mean drift length is only 0.25 mm (half the thickness of the conversion material). The proposed design provides a 2.4 times higher count-rate division with smaller cells and one order of magnitude shorter drift length of the electrons.

Figure 3:
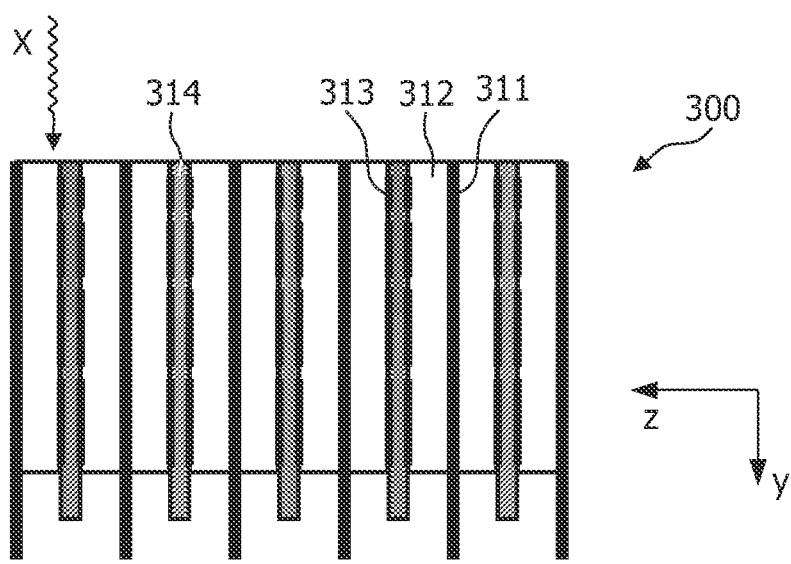
FIG. 3 shows schematically a side view of a multilayer X-ray detector according to the present invention with intermediate substrates.

FIG. 3 shows a side view of a multilayer detector 300 like to that of FIG. 2. The multilayer detector 300 comprises a plurality of sensitive layers 312 with an array of (differently sized) electrodes 313 on their front sides and a single electrode 311 covering their back side, wherein the front sides/back sides of adjacent sensitive layers face each other. In contrast to FIG. 2, there is no insulation layer in between the front sides of two adjacent sensitive layers, but a substrate 314 (typically a semiconductor like silicon, glass, ceramics, a printed circuit board or some equivalent device). The substrates 314 carry the CZT-modules 312 and connect the front-side electrodes 313 with the readout and evaluation electronics (not shown).

Figure 4:
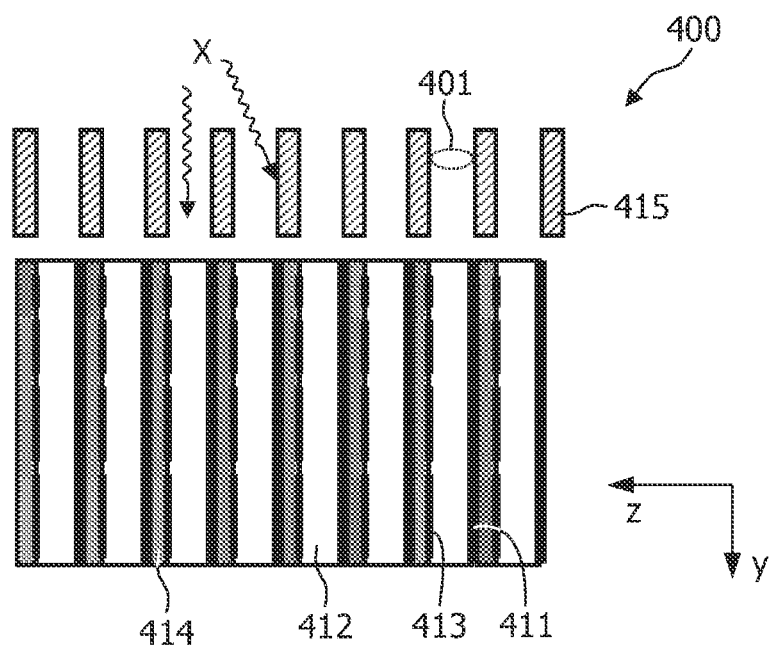
FIG. 4 shows schematically a side view of a multilayer X-ray detector according to the present invention with intermediate layers for absorbing fluorescence photons.

FIG. 4 shows a schematic side view of another embodiment of a multilayer X-ray detector 400, which can favorably be combined with the previously described embodiments and which comprises as before a stack of sensitive layers 412 covered on their back sides with a common cathode 411 and on their front sides with an array of anodes 413. The detector 400 provides a solution to the problem of crosstalk between neighboring slices. Crosstalk mediated by fluorescence photons limits the spectral performance of sensors with pixel widths below about 100-300 μm. For high-Z materials of the sensitive layer, which are indispensable for detection of hard X-rays, fluorescence is the most likely de-excitation process for atoms that were subject to a primary interaction process. Crosstalk with neighboring pixels is, thus, inherent for CT X-ray detectors. Because designs for Spectral-CT detectors feature a subdivision of pixels (about 1×1 mm² size) into sub-pixels, crosstalk between neighboring pixels is here even more a concern. As the sub-pixel dimensions have to be chosen as small as possible in an X-ray CT detector, measures have to be taken to push the minimum pixel size further down, i.e. to deal with the problem of crosstalk.

The detector 400 solves the aforementioned problem by inserting an additional absorbing layer 414 that is parallel to the plane of electrodes. The material of this absorbing layer 414 is optimized to suppress fluorescence photons from the material of the sensitive layer 412, for example from Cd or Te in the case of a Cd(Zn)Te based detector. There are several options for the concrete realization:

The absorbing layer 414 can be mounted in direct contact with the common electrode 411. In an extreme case, the absorbing layer can be a thickened electrode layer, though in this case further measures should be taken to prevent lift-off of the thick electrode.

An insulating layer (not shown in FIG. 4) is placed between the absorbing layer 414 and the common electrode 411. This insulating layer could for example be the oxidized surface of the absorbing metal layer.

The last option could be implemented with the absorbing layer close to the layer of pixelated electrodes.

For an efficient suppression of fluorescence photons, the K-edge of the absorbing material has to be slightly below the fluorescence photon energy. For the case of CdTe-type detectors (with Z=48 and Z=50), suitable materials for the absorbing layer 414 would be, e.g. Ag, Pd, Mo, Zr. For instance, a 100 μm thick layer of Molybdenum absorbs 93% of 24 keV photons ($K_\alpha$ Cd) and 85% of 28 keV photons ($K_\alpha$ Te).

In order to keep a high geometric detective quantum efficiency, the absorbing layers 414 are preferably placed at particular positions. It is for example advantageous to locate the absorbing layers 414 in planes that are similar to those planes which are defined by the lamellas 415 of an anti-scatter grid (ASG) disposed in front of the detector 400. The lamellas 415 of the ASG cast shadows, which define the insensitive detector area. It is therefore proposed to place the edges of the absorbing layers 414 at these insensitive regions, because the new layers then do not decrease the active detector volume. Of course the same alignment with respect to the ASG lamellas 415 can favorably e done for other insensitive components like the electrodes 411, 413 or optional insulating layers. It should further be noted that the lamellas 415 of the ASG define apertures 401 through which X-radiation can enter.

For the connection of the individual electrodes on the front side of the sensitive layers, different routing schemes for an efficient electronic connection and signal readout via amplifiers, discriminators and further (counting) electronics are possible, for example:

A direct coupling of the e.g. CMOS based electronics or other front-end electronics to each electrode. As CMOS electronics is relatively bulky, this is less favorable for CT applications since it requires a layer of a certain thickness leading to a high loss in geometrical detective quantum efficiency. The main limitation is here the interconnection aspect, as bond bumping takes a considerable amount of space. Other connecting techniques may however be more suitable. A direct coupling will therefore primarily be a solution in applications with large pixel sizes, e.g. baggage inspection.

Instead of using a CMOS substrate as interposer, a routing layer can be used which yields a much thinner gap between pixels. The routing layer can also be made double sided, allowing to interconnect two pixels with the same interposer. Particularly applications like baggage inspection may benefit from this approach.

Figure 5:
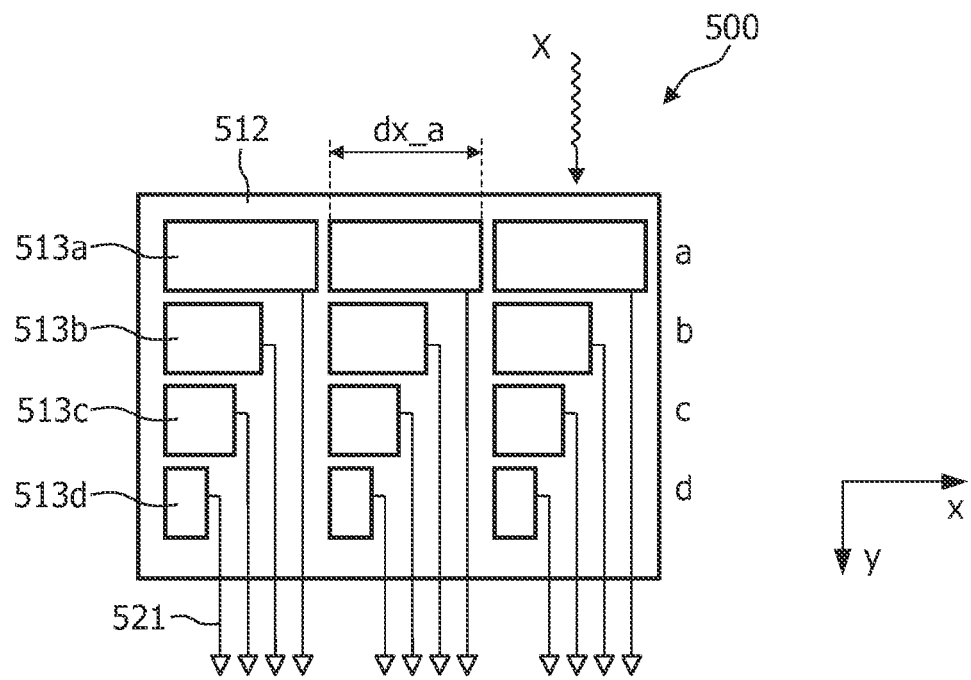
FIG. 5 shows a preferred routing of electrodes on the front side an X-ray detector according to the present invention.

An elegant solution for the connection problem is a routing scheme without an interposer layer according to a design 500 of FIG. 5. The basic idea is to decrease the size of the front side electrodes of a sensitive layer 512 in x-direction starting with the largest width dx_a of the top electrode 513a in the uppermost pixel row a. This allows for a routing structure 521 in vertical y-direction to the further signal processing electronics below the bottom electrodes 513d in the bottom row d of pixels. The concrete position and distribution of the electrodes 513a, 513b, 513c, 513d may of course vary from the exemplary one shown in FIG. 5. It should be noted that an insulation layer (not shown) is typically needed, especially if the anodes or cathodes are not facing each other.

As shown in FIGS. 1 to 4, a further embodiment may additionally consider asymmetrical y-dimensions of the electrodes 513. This approach is possible without loosing charge collection efficiency of the detector due to the fact that direct conversion relies on electric fields. Here, the gap between neighboring pixels can be ignored with respect to the performance up to a gap size of about 100 μm (as discussed e.g. in A. E. Bolotnikov et al. Nucl. Instr. and Meth. in Phys. Res. A 432 (1999) 326-331): given the surface of the CZT array is almost ideally dielectric (i.e. only slightly conducting), then for smaller pixels and a larger gap the electric field lines still end at the pixel but are more bended. Charges are thus efficiently collected at the pixel also from areas outside the pixel size.

The invention can be applied in each kind of X-ray detector for which faster response times and low afterglow (while keeping spatial resolution) is of importance, particularly in Computed Tomography (CT) detectors. It opens the possibility of single photon counting detection in high intensity applications like CT with additional provision of spectral information with all its benefits. Besides X-ray detection and CT, many other applications may benefit from the proposed counting electronics with energy resolution, too.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. A radiation detector, comprising:
a radiation aperture through which photons propagating along a mean radiation direction can enter;
a sensitive layer for the conversion of photons coming through the radiation aperture into an electrical signal, said sensitive layer having a front side and back side which are parallel to the radiation direction;
a two-dimensional array of individually addressable electrodes that are located on the front side of the sensitive layer, wherein at least two electrodes on the front side have different shapes;

at least one counter-electrode that is located on the back side of the sensitive layer, wherein connecting lines are located on the front side, wherein each of said lines leads from one connecting edge of the sensitive layer to one electrode.

2. The radiation detector according to claim 1, wherein at least two electrodes on the front side have a different height as measured in the radiation direction.

3. The radiation detector according to claim 2, wherein said height increases in the radiation direction.

4. The radiation detector according to claim 1, wherein at least one electrode is connected to a signal processing circuit that comprises at least one amplifier, discriminator and/or pulse counter.

5. The radiation detector according to claim 1, wherein at least one electrode is connected to an evaluation module for associating the position of the electrode to the energy of the detected photons.

6. The radiation detector according to claim 1, wherein the electrodes have a width as measured parallel to the connecting edge that increases with distance from the connecting edge.

7. The radiation detector according to claim 1, wherein it comprises a plurality of such sensitive layers that are stacked one behind the other in a direction from their front side to their back side.

8. The radiation detector according to claim 7, wherein it comprises at least two adjacent sensitive layers with facing front sides or back sides.

9. The radiation detector according to claim 7, wherein an insulation layer, a semiconductor layer, a photon absorbing layer, and/or a layer with lines connecting the electrodes is located between the adjacent sensitive layers.

10. The radiation detector according to claim 9, wherein the photon absorbing layer is highly absorbing for fluorescence photons generated in a sensitive layer.

11. An X-ray detector comprising a radiation detector according to claim 1.

12. An imaging system, comprising the radiation detector according to claim 1.

13. A radiation detector, comprising:
a radiation aperture through which photons propagating along a mean radiation direction enter;
a sensitive layer for the conversion of photons coming through the radiation aperture into an electrical signal, said sensitive layer having a front side and back side which are parallel to the radiation direction;
a two-dimensional array of rows of individually addressable electrodes that are located on the front side of the sensitive layer, wherein at least two electrodes of at least two different rows of the two-dimensional array of rows of the individually addressable electrodes have different shapes along an x-direction, which is perpendicular to the radiation direction; and
a routing structure in a vertical y-direction, which is parallel to the radiation direction, from each individually addressable electrode to processing electronics external to the sensitive layer.

14. The radiation detector of claim 13, further comprising:
at least one counter-electrode that is located on the back side of the sensitive layer.

15. The radiation detector of claim 13, wherein shapes of the individually addressable electrodes at least one of sequentially increase in size or sequentially decrease in size from row to row.

16. The radiation detector of claim 13, wherein the sensitive layer includes at least one of CZT, Selenium or PbO.

17. The radiation detector of claim 13, further comprising:
connecting lines located on the front side, wherein each of said lines leads from one connecting edge of the sensitive layer to one electrode.

18. A method, comprising:
receiving, through a radiation aperture, photons propagating along a mean radiation direction;
sensing, with a sensitive layer, photons coming through the radiation aperture, and converting, with the sensitive layer, sensed photons into an electrical signal, wherein the sensitive layer has a front side and back side which are parallel to the radiation direction,
receiving the signal at a two-dimensional array of rows of individually addressable electrodes that are located on the front side of the sensitive layer, wherein at least two electrodes on the front side have different shapes; and
routing the signals from the two-dimensional array of rows of individually addressable electrodes via connecting lines located on the front side, wherein each of said lines leads from one connecting edge of the sensitive layer to one electrode.

19. The method of claim 18, wherein the at least two electrodes of the at least two different rows of the two-dimensional array of rows of the individually addressable electrodes have different shapes along an x-direction, which is perpendicular to the radiation direction.

* * * * *